United States Patent
Berg et al.

(10) Patent No.: US 7,551,517 B2
(45) Date of Patent: Jun. 23, 2009

(54) SEABED SEISMIC STATION PACKAGING

(75) Inventors: Arne Berg, Kattern (NO); Erlend Ronnekleiv, Trondheim (NO); Ole Henrik Waagaard, Trondheim (NO); Jon Thomas Kringlebotn, Trondheim (NO); Hilde Nakstad, Trondheim (NO); Roar Furuhaug, Trondheim (NO)

(73) Assignee: Optoplan AS, Trondheim (NO)

( * ) Notice: Subject to any disclaimer, the term of this patent is extended or adjusted under 35 U.S.C. 154(b) by 135 days.

(21) Appl. No.: 11/381,922

(22) Filed: May 5, 2006

(65) Prior Publication Data
US 2007/0258330 A1    Nov. 8, 2007

(51) Int. Cl.
G01V 8/24 (2006.01)
G01V 8/16 (2006.01)
G01V 1/38 (2006.01)
G01H 9/00 (2006.01)

(52) U.S. Cl. ..................... 367/149
(58) Field of Classification Search .......... 367/15, 367/17, 149, 151, 167, 176; 73/514.09, 514.11, 73/514.16, 514.26; 385/12, 13; 250/227.14, 250/227.16, 227.25
See application file for complete search history.

(56) References Cited

U.S. PATENT DOCUMENTS

| | | | | |
|---|---|---|---|---|
| 3,998,104 A | * | 12/1976 | Albert | 73/503 |
| 4,477,887 A | * | 10/1984 | Berni | 367/20 |
| 4,530,078 A | * | 7/1985 | Lagakos et al. | 367/149 |
| 4,570,248 A | * | 2/1986 | Assard | 367/149 |
| 5,033,032 A | * | 7/1991 | Houghtaling | 367/160 |
| 5,384,871 A | * | 1/1995 | Devenyi | 385/19 |
| 6,307,809 B1 | | 10/2001 | Luscombe et al. | |
| 6,384,919 B1 | * | 5/2002 | Fersht et al. | 356/477 |
| 6,549,488 B2 | | 4/2003 | Mass et al. | |
| 6,607,050 B2 | | 8/2003 | He et al. | |
| 6,625,724 B1 | | 9/2003 | Kahn et al. | |
| 6,882,595 B2 | | 4/2005 | Woo et al. | |
| 6,888,972 B2 | | 5/2005 | Berg et al. | |
| 6,982,925 B2 | | 1/2006 | Maas et al. | |
| 7,013,729 B2 | | 3/2006 | Knudsen et al. | |
| 7,019,837 B2 | | 3/2006 | Waagaard | |
| 2004/0156267 A1 | * | 8/2004 | O'Brien et al. | 367/149 |
| 2004/0202401 A1 | * | 10/2004 | Berg et al. | 385/12 |
| 2005/0088660 A1 | | 4/2005 | Ronnekleiv | |
| 2005/0097955 A1 | | 5/2005 | Berg et al. | |

(Continued)

FOREIGN PATENT DOCUMENTS

GB    2437839    * 11/2007

OTHER PUBLICATIONS

Rines, Glen A. "Fiber-optic accelerometer with hydrophone applications" in Applied Optics, vol. 20 No. 19, Oct. 1, 1981.*
Berg, et al, U.S. Appl. No. 11/313,275, filed Dec. 20, 2005.

(Continued)

Primary Examiner—Dan Pihulic
(74) Attorney, Agent, or Firm—Patterson & Sheridan, L.L.P.

(57) ABSTRACT

A seismic sensor station includes a housing containing a fiber optic hydrophone and a fiber optic accelerometer that can both be made from a single length of optical fiber arranged inside the housing. The fiber optic accelerometer is arranged in a liquid/oil filled compartment of the housing for dampening of mechanical resonances in the accelerometer due to mechanical disturbances and pressure fluctuations.

22 Claims, 6 Drawing Sheets

U.S. PATENT DOCUMENTS

2006/0198246 A1    9/2006  Frederick et al.
2007/0189658 A1*   8/2007  Maas ........................... 385/12
2007/0258330 A1*  11/2007  Berg et al. ................... 367/149

OTHER PUBLICATIONS

S. Maas, et al, Fiber Optic 4C Seabed Cable Field Trials, SEG International Exposition and Seventy-Fourth Annual Meeting, Denver Colorado, Oct. 15, 2004, Society of Exploration Geophysics.

Norway Office Action, Application No. 2006 2027, Dated Apr. 17, 2007.

Fibre Optic Seismic for Permanent Seabed Reservoir monitoring, Business Briefing: Exploration and Production: The Oil & Gas Review 2003—vol. 2, Nov. 2003.

GB Search Report, Application No. GB0708618.4, dated Aug. 24, 2007.

* cited by examiner

SEABED SEISMIC STATION PACKAGING

BACKGROUND OF THE INVENTION

1. Field of the Invention

Embodiments of the invention relate to ocean bottom seismic surveying using seismic sensors deployed at the bottom of the sea. More particularly, embodiments of the invention relate to a seismic station housing in an ocean bottom seismic surveying system using an ocean bottom deployed seismic cable with seismic stations along its length.

2. Background and Prior Art

Seismic surveying using fiber optic technology has recently received attention. Optical based sensors for performing the surveying can include a hydrophone and geophones. These sensors can be fabricated, for example, using Michelson interferometers.

A general problem of arranging a hydrophone together with a three-axis geophone or accelerometer in a four-component seismic sensing station is the cross sensitivity between the hydrophone and the geophones/accelerometers. While it is generally desirable to optimize the exposure of the hydrophone to pressure variations, it is generally undesirable to let pressure variations influence the geophones. The influence of the pressure signal on the geophones/accelerometers creates an undesirable cross sensitivity.

Other potential problems exist with arrangements in the four-component seismic sensing station. One problem of mounting geophones/accelerometers inside an air-filled pressure sealed housing involves mechanical resonances in the geophones/accelerometers. Integrating several fiber optic sensors along a fiber loop in subsea environments creates other limitations relating to connecting arrangements, which require high pressure penetrators for guiding a fiber between low pressure surroundings and high pressure surroundings, and vice versa.

Therefore, there exists a need for an improved seismic sensor station for arranging a hydrophone and one or more geophones.

SUMMARY OF THE INVENTION

Embodiments of the invention relate to a seismic sensor station including a fiber optic hydrophone and a fiber optic accelerometer arranged inside a housing and interconnected by optical fiber. The fiber optic accelerometer is arranged in a liquid filled compartment of the housing for dampening of mechanical resonances in the accelerometer due to mechanical disturbances and pressure fluctuations.

For some embodiments, the fiber in the housing includes an array of fiber Bragg gratings forming an array of interferometers, whereby one interferometer is provided for each of the sensors and a reference. The liquid filled compartment containing the accelerometers is pressure isolated, in some embodiments. An air bladder arranged within the liquid filled compartment can stabilize the internal pressure inside the housing by compensating for thermal expansion of the housing and/or liquid.

In some embodiments, a pressure transfer device transfers pressure variations between the surrounding environment and an inside of a hydrophone compartment of the housing, the hydrophone compartment containing an optical fiber coil of the hydrophone. The pressure transfer device can include a flexible membrane or a liquid filled bladder. For some embodiments, the pressure transfer device includes an elongated tubular structure providing an opening between the liquid filled compartment and the hydrophone compartment for passing DC and low frequency pressure fluctuations into the liquid filled compartment while at the same time blocking high frequency pressure signals form entering the liquid filled compartment.

The liquid filled compartment containing the accelerometers can be pressure balanced towards a surrounding environment. According to some embodiments, the pressure balanced housing includes a pressure transfer device that transfers pressure variations between the surrounding environment and an inside of the liquid filled compartment. The pressure transfer device can include a flexible membrane or a liquid filled bladder. For some embodiments, the pressure transfer device includes an elongated tubular structure providing an opening between an inside volume of the housing and the external environment which passes DC and low frequency pressure fluctuations but blocks high frequency pressure signal from entering the housing. The tubular structure diameter can be significantly smaller than the tubular structure length.

The accelerometer and the hydrophone can both be arranged within the liquid filled compartment of the housing, thus requiring a minimum of two fiber splices inside the liquid filled compartment. The hydrophone can also be arranged in a hydrophone compartment of the housing separate from the liquid filled compartment.

For some embodiments, an internal bladder is placed in contact with an internally pressurized hydrophone such that the bladder provides a combined function of internal pressure compensation and air-backing of the hydrophone.

According to some embodiments, a high pressure accumulator is arranged inside the housing for accommodating changes in temperature or pressure inside the housing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

In all of the embodiments illustrated in FIGS. 1-6, there is a housing 1, three fiber optic accelerometers, denoted x, y and z, for sensing acceleration in three different directions and a fiber optic hydrophone, denoted H, for sensing dynamic pressure variations. The hydrophone H and the accelerometers x, y, z are all arranged along a single length of optical fiber. On each side of the hydrophone H, or the accelerometers x, y, z there is arranged a fiber optic grating which reflects, at least partly, incoming light of a wavelength matching the optical reflection band of the grating.

The accelerometers x, y, z and the hydrophone H are the basic sensor building blocks of the seismic sensor station. As a common feature of all embodiments, at least one of the accelerometers x, y, z is immersed in a volume of liquid contained in a first compartment 10 of the housing 1 serving to dampen mechanical resonances in the accelerometers x, y, z and in a reference interferometer 4. Preferably, all accelerometers in the housing 1 are placed in a liquid (oil) filled compartment, as indicated in the appended drawings.

In some embodiments, the accelerometers x, y and/or z are arranged in the first compartment 10 of the housing 1, while the hydrophone H is arranged in a second compartment 20 of the housing 1. FIGS. 1, 2, 3 and 5 show exemplary configurations of such an arrangement.

Figure 1:
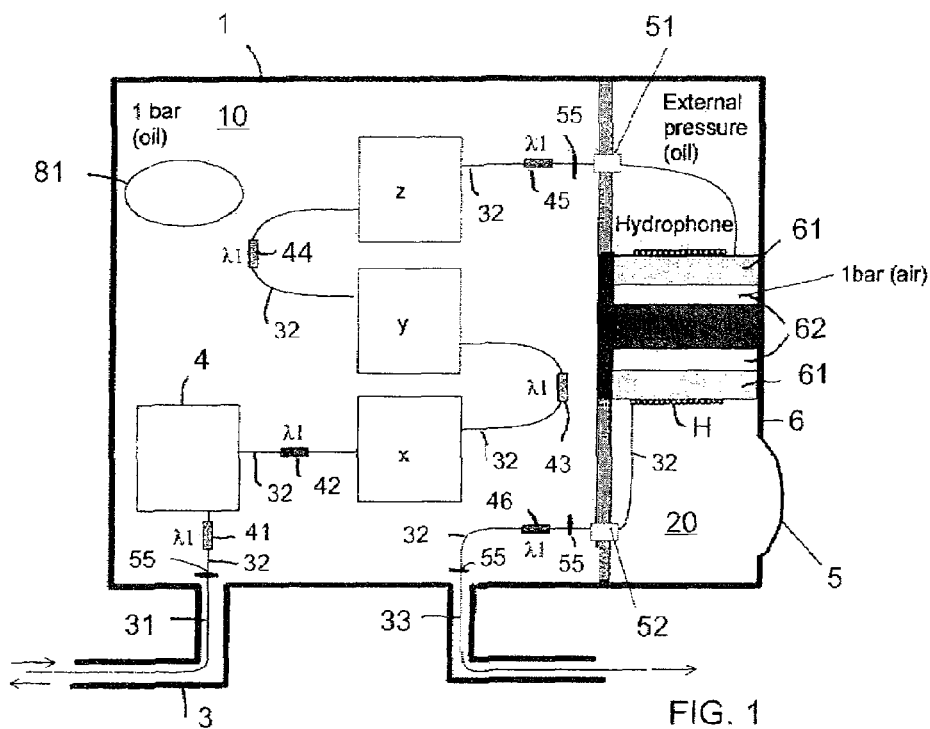
FIG. 1 shows a seismic station according to one embodiment of the invention having accelerometers in a pressure isolated first compartment of a housing and an externally pressurized, air-backed hydrophone arranged in a second compartment exposed to a pressure of an external environment.
Figure 3:
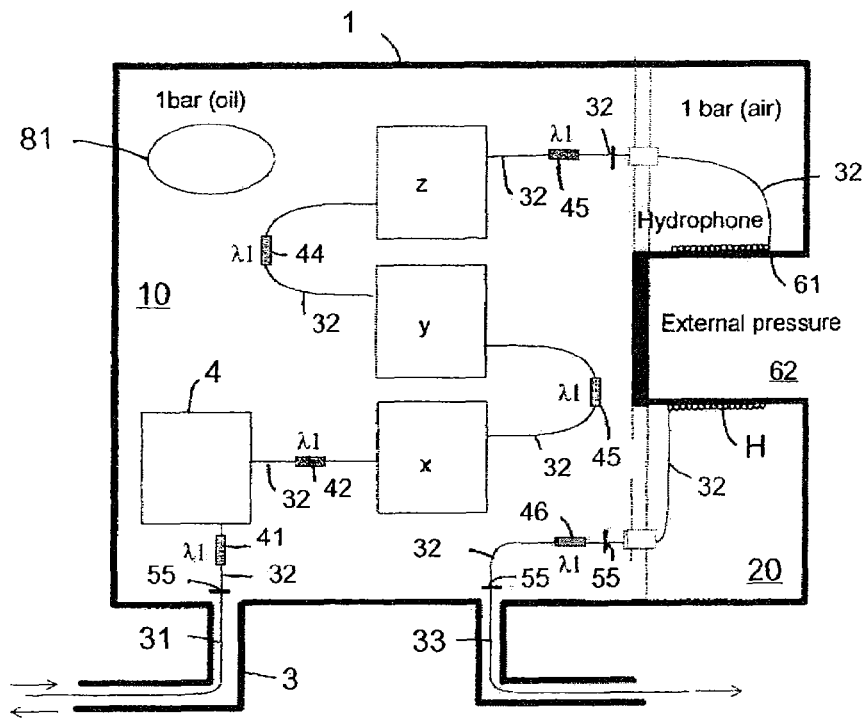
FIG. 3 shows a seismic station according to one embodiment of the invention in which accelerometers are arranged in a pressure isolated first compartment of a housing and an internally pressurized, air-backed hydrophone is arranged in a second compartment.
Figure 4:
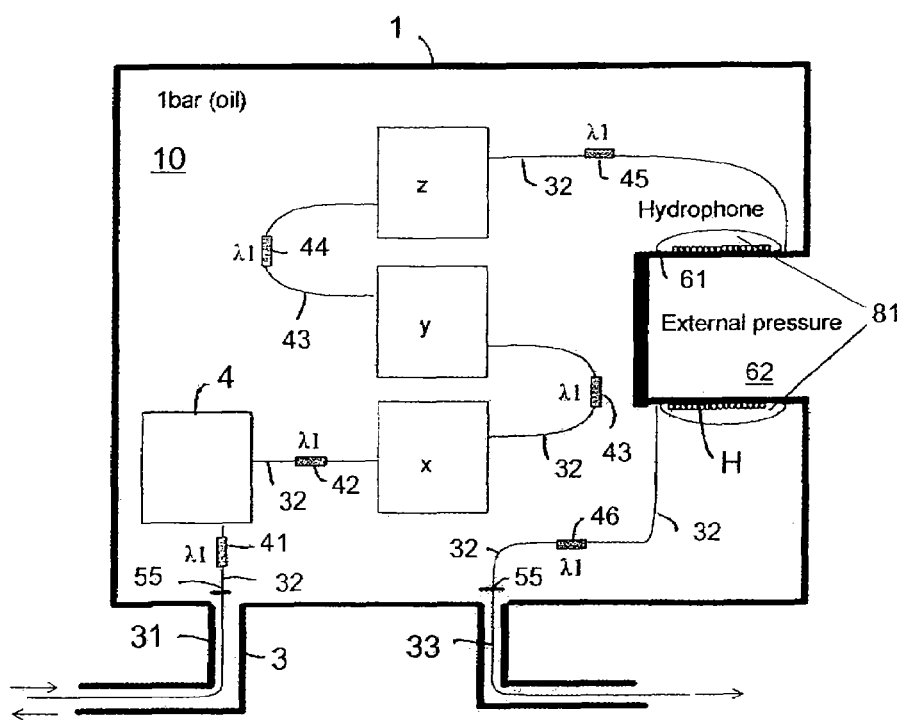
FIG. 4 shows a seismic station according to one embodiment of the invention in which accelerometers are arranged in a pressure isolated compartment of a housing and an internally pressurized, hydrophone with air-backing provided by an air-filled bladder is arranged in the same compartment.

For some embodiments, the housing 1 is pressure isolated, as indicated in FIGS. 1, 3 and 4. Using a pressure isolated housing has the advantage of shielding the accelerometers x, y, z and the reference interferometer 4 from external pressure variations, thus minimizing pressure induced crosstalk. A pressure isolated housing, and use of high pressure fiber penetrators, however, has the potential of leakage problems and reduced reliability of the housing.

Figure 2:
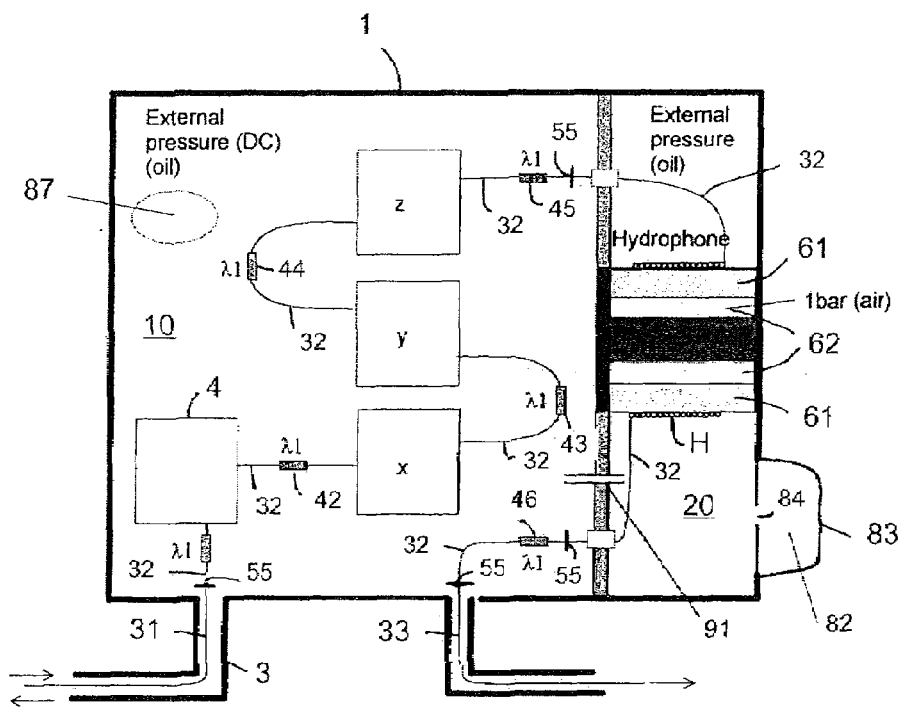
FIG. 2 shows a seismic station according to one embodiment of the invention in which accelerometers are arranged in a pressure balanced first compartment of a housing and an externally pressurized, air-backed hydrophone is arranged in a second compartment exposed to a pressure of an external environment.
Figure 6:
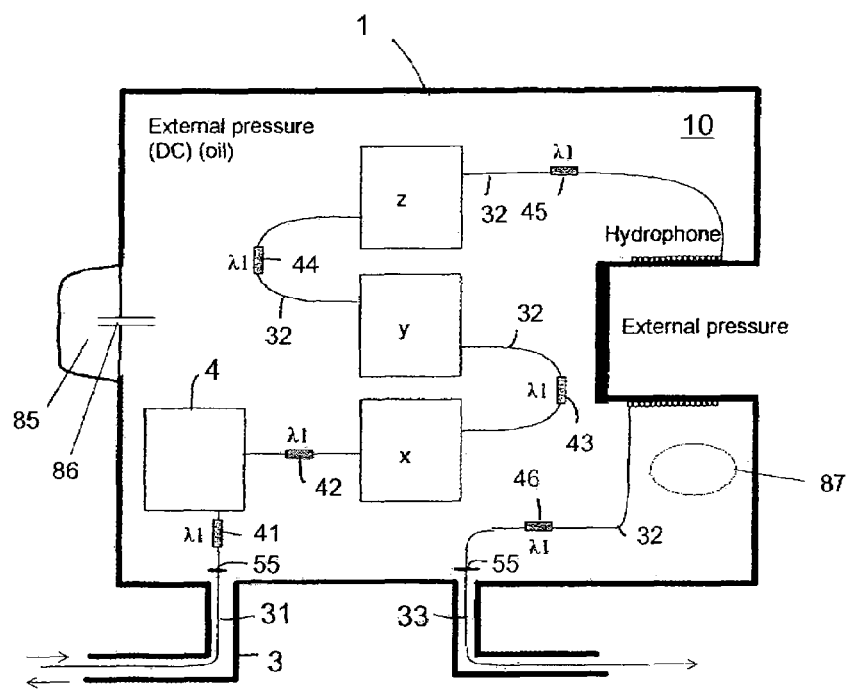
FIG. 6 shows a seismic station according to one embodiment of the invention in which accelerometers are arranged in a pressure DC balanced first, oil-filled compartment of a seismic station housing and an internal, oil-backed hydrophone is arranged in the same compartment.

According to some embodiments, a pressure DC balanced sensor housing is used, whereby the accelerometers x, y, z and the reference interferometer 4 are isolated from AC pressure fluctuations, for example as shown in FIG. 6. As an example, a thin tube 91 arranged as indicated in FIG. 2, having an inner diameter of about 0.5 mm and a length of about 10.0 mm or more effectively blocks pressure fluctuations of frequencies above about 5.0 Hz. Advantageously, a pressure balanced housing eliminates the need for DC-pressure sealing of the housing. The thin tube 91 functions as an AC-filter preventing pressure signals above a frequency given by the dimensions of the tube from influencing the accelerometers inside the housing, while still achieving DC-pressure balancing of the inside of the housing.

In some embodiments, the accelerometers x, y, and/or z are arranged in the same first compartment 10 as the fiber optic hydrophone H. Exemplary configurations of this arrangement are shown in FIG. 4 (pressure isolated) and FIG. 6 (DC pressure balanced). This configuration has the benefit that all of the fiber optics can be arranged in the same pressure surroundings, for example using an FBG sensor array along one continuous fiber without need for internal fiber splices, whereby high pressure penetrators are avoided inside the seismic station housing. When the whole housing is pressure isolated, as for example in FIG. 4, a pressure of about 1.0 bar can be used in protective tubes 3 between the stations and in the connection node (e.g., a dry-node), and also from the connection node up to the surface. In DC pressure balanced housings, as in FIGS. 2, 5 and 6, a high pressure penetrator is used at the connection node whose internal pressure is always kept at about 1.0 bar. When the pressure increases upon deployment of the stations, oil flows into the protective tubes 3 that are grease filled requiring refilling oil into the housing 1 from an oil-filled bladder 82 or 85.

Figure 10:
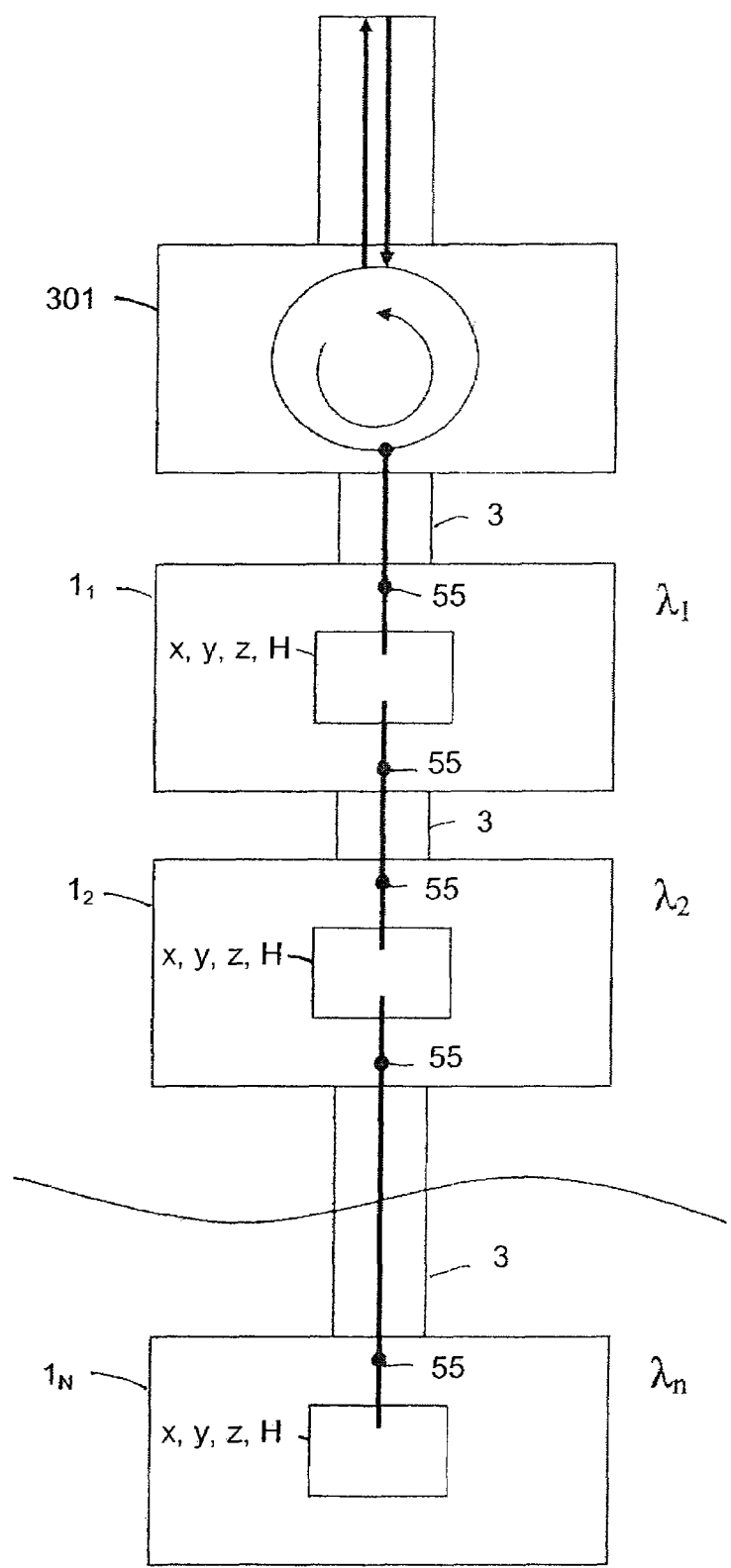
FIG. 10 illustrates an array of seismic sensor stations utilizing housings, according to embodiments of the invention, and coupled to a connection node with single fiber tubes connecting each pair of adjacent seismic stations along the array.

In all embodiments, an optical signal is guided to the housing 1 in an optical fiber arranged inside protective tubes 3 outside the housing 1. An input fiber 31 and an output fiber 33 can run in separate protective tubes, thus requiring two tube terminations on the seismic sensor station housing. When arranged in a seismic cable array, each seismic station housing has separate entrance and exit tubes, except for the last station in an array, as illustrated in FIG. 10. When using FBG-based sensors, the sensor can be interrogated in reflection mode, i.e., using the same fiber for input and output of optical signals from a connection node 301 and throughout the array of seismic stations $1_1, 1_2, \ldots 1_n$. The protective tubes 3 are thus single fiber tubes used to protect the fiber between the seismic stations. Thus, the pressure inside the protective tubes 3 and the pressure inside the compartment 10 of the seismic stations is the same along the whole array from the connection node 301 to the last seismic station $1_n$.

For all embodiments illustrated, the optical fiber inside the seismic sensor housing 1 also provides the reference interferometer 4, which is preferably placed in the first compartment 10 together with the accelerometers x, y, and z. Further, all the fiber Bragg grating elements can be located in the same first compartment 10 of the sensor housing 1 that the accelerometers x, y, and z are arranged in, regardless of whether the hydrophone H is arranged in the first compartment 10 or another second compartment 20 of the housing 1.

FIG. 1 illustrates an embodiment where an input optical fiber 31 enters a first compartment 10 of the seismic sensor station housing 1 from a protective tube 3 at a sealed connection between the protective tube and the housing. In this case, the first compartment is pressure isolated at about 1.0 bar and filled with a liquid, which is preferably oil. A section forming an internal optical fiber 32 inside the housing is laid out in such a manner that the guided light first passes a first fiber Bragg grating 41, then it passes through a fiber reference interferometer 4, and then through a second fiber Bragg grating 42. Next, the guided light passes though a first accelerometer x, after which the light passes through a third fiber Bragg grating 43. Then, the light is guided through a second accelerometer y, after which it passes through a fourth fiber Bragg grating 44. Next, the light is guided in the same optical fiber through a third accelerometer z, after which it passes through a fifth fiber Bragg grating 45. The optical fiber then guides the light into a second compartment 20 of the housing 1 via a first high pressure penetrator 51. The second compartment 20 is exposed to the pressure of the external environment via a pressure transmitting part 5, such as for example a flexible membrane forming a part of a wall 6 of the second compartment 20 between an inside of the compartment and an external environment. In the second compartment 20, the optical fiber is arranged to form a hydrophone H, preferably as a fiber coil wound around a structure 61 that can define a cylinder-like shape. After the hydrophone, the internal optical fiber 32 passes through a second high pressure penetrator 52 back into the first compartment 10, where the light then passes through a sixth fiber Bragg grating 46 of the optical fiber. The first and second penetrators 51, 52 are illustrated as separate parts, however, in some embodiments of the invention these two elements can be combined in a single penetrator for holding optical fiber crossing into and out of the second compartment 20. Subsequently, the optical fiber exits the seismic sensor housing 1 to form an output optical fiber 33 going into a protective tube at a sealed connection, preferably the same protective tube as the input optical fiber 31 is going through.

The hydrophone H is preferably formed by winding the internal optical fiber 32 onto the structure 61 that can be an air backed cylinder, i.e., a cylinder defining an internal volume 62 that can be air or gas filled at about 1.0 bar, whereby the cylinder changes shape thereby changing the length of the optical fiber when subjected to variations in external pressure. The second compartment 20 is also oil-filled.

An internal air bladder 81 is preferably arranged inside the first compartment 10 in order to accommodate small variations in the volume of oil inside the first compartment due to, e.g., temperature variations. Thus, the air bladder assists in reducing pressure effects caused by thermal expansion or contraction of the oil inside the first compartment 10 or the housing 1 itself.

FIG. 2 illustrates a second embodiment of the seismic sensor housing 1 according to the invention in which the optical fiber 31, 32, 33 is arranged in the same manner as in FIG. 1. However, the pressure regime of the housing 1 is different. In FIG. 2, there is shown a thin tube 91 between the first compartment 10 and the second compartment 20 of the housing 1. The effect of the thin tube 91 is to effectively balance, at slow pressure variations, the internal pressure of the first compartment 10 to the pressure of the second compartment 20 and the external pressure via an oil filled bladder 82 and the thin tube 91. The thinness of the tube 91 effectively creates a delay in the pressure balancing function, whereby slow pressure variations are balanced out as the tube has time to pass enough liquid to equalize the pressures of the first and second compartments, while fast pressure fluctuations cannot be equalized due to the delay caused by the thinness of the tube. The thinness of the tube 91 can be chosen to have a dimension so as to effectively stop pressure fluctuations above a given frequency to pass into the first compartment, subject of course to the limitations of the actual physical geometry and dimensions of the sensor station housing.

Having both compartments at pressures balanced or equalized with the external environment provides the benefit that the structure of the housing can be simplified since the housing does not have to be designed to withstand large pressure differentials, as in the case of a low pressure, sealed housing placed in high pressure subsea environments. Also, internal high pressure penetrators are not required in this case since the pressure difference between the first compartment 10 and the second compartment 20 is normally small, due to the pressure equalization caused by the thin tube 91 and the oil filled bladder 82. The oil filled bladder 82 has a flexible wall 83 exposed to the surrounding environment and is arranged to cover an opening 84 in the wall of the housing 1 of the seismic sensor station. This way the liquid/oil of the bladder 82 may enter or exit the housing to accommodate variations in external pressure and temperature. Provided the liquid/oil bladder is made sufficiently large, the bladder 82 can compensate for a change in the volume of the oil in the protective tubes 3 (initially at 1.0 bar) going between assemblies of interconnected seismic station housings along a seismic cable.

The embodiments of the housing 1 according to the invention shown in FIGS. 1 and 2 are provided with an externally pressurized, air backed hydrophone, while the embodiments shown in FIGS. 3 and 4 are provided with an internally pressurized, air/liquid backed hydrophone. In order to avoid confusion, the terms internally pressurized and externally pressurized can be defined as follows.

In an externally pressurized hydrophone, the pressure of the surrounding environment is acting on the external surface of the structure 61 which the hydrophone coil is coiled upon, whereby in high pressure surroundings, the structure 61 is compressed causing a decrease in tension of the hydrophone coil which has been coiled onto the cylindrical structure. For deployment at some depths, the hydrophone fiber coil thus normally has to be pre-tensioned to some extent prior to deployment, in order not to become a completely loose or slack fiber bundle when the cylindrical structure compresses at the increased pressure when being deployed into the ocean.

In an internally pressurized hydrophone, the internal volume of the structure 61 is open towards the surrounding environment, in order that a high pressure in the surroundings creates an expansion of the cylindrical structure and a corresponding increase of the tension in the hydrophone coil wrapped onto the outer surface of the cylindrical structure.

The term "external pressure" on the appended drawings does not refer to the actual internal or external pressurization of the hydrophone, but rather this term refers to the pressure or pressure signal of the surrounding environment acting on the hydrophone, i.e., it indicates where a pressure signal to be detected enters the seismic sensor station housing and acts on the hydrophone.

FIG. 3 shows a third embodiment of the seismic sensor housing 1 according to the invention in which the optical fiber 31, 32, 33 is arranged in the same manner as in FIG. 1, but the pressure regime of the hydrophone is different from the one in FIG. 1. In FIG. 3, the internal volume 62 defined by the structure 61 is open towards the external environment. Beneficially, the second compartment 20 of the housing which accommodates the optical fiber coil of the hydrophone H is then a part of the pressure sealed part of the housing 1, whereby internal high pressure penetrators are avoided. Further, the mounting of the optical fiber coil of the hydrophone H is simplified, so that the fiber can be fairly loosely arranged prior to deployment, while the increasing external pressure during deployment causes a tightening of the fiber coil when subject to the pressures at large sea depths. The second compartment 20 accommodating the hydrophone coil can be air filled, effectively creating an air backed hydrophone structure. In an alternative, the second compartment 20 in this case can be oil-filled. The choice of air or oil is determined by the response required by the hydrophone, as air and oil provides different frequency responses. The internal pressurization of the hydrophone fiber coil illustrated in this embodiment can be particularly beneficial in a seismic sensor housing 1 according to this invention, as this enables the accelerometers x, y, z, the fiber Bragg gratings 41-46, and the hydrophone coil to be arranged in the same first compartment 10 of the housing 1, as illustrated in FIG. 4

FIG. 4 further illustrates how air backing of the hydrophone can still be achieved by arranging the internal air bladder 81 over the optical fiber coil. In addition to air backing, the internal air bladder 81 performs the function of compensating for internal pressure variations caused for example by thermal expansion or contraction of the liquid/oil inside the housing or the housing itself. A further benefit of the design of FIG. 4 is that this can be realized without using penetrators and with a continuous fiber/FBG-array with no internal splices.

Figure 5:
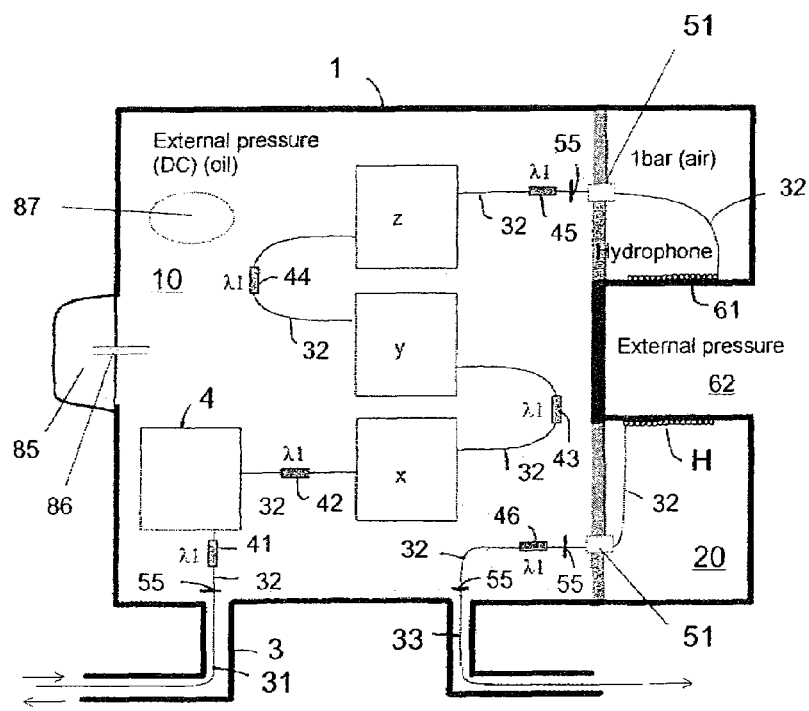
FIG. 5 shows a seismic station according to one embodiment of the invention in which accelerometers are arranged in a pressure DC balanced first compartment of a station housing and an internally pressurized, air backed hydrophone is arranged in a second compartment of the housing.

FIG. 5 illustrates yet another embodiment of the seismic sensor housing 1 according to the invention in which the optical fiber 31, 32, 33 is arranged basically in the same manner as in FIG. 1 so as to maintain the accelerometers in an oil filled first compartment 10 of the seismic sensor housing 1, however with a different pressure regime. FIG. 5 illustrates how a pressure balanced seismic sensor station can be achieved with an internally pressurized hydrophone as shown in FIGS. 3 and 4. In a manner similar to the arrangement in FIG. 2, an oil filled bladder 85 having a flexible wall exposed to the surrounding environment can be arranged to cover an opening 86 in the wall of the first compartment 10 of the housing 1 of the seismic sensor station. This way the liquid/oil of the bladder 85 may enter or exit the first compartment to accommodate variations in external pressure. Provided the opening is designed in the form of a tubular structure of small cross sectional area, the internal oil filled volume of the first compartment 10 is effectively DC pressure compensated, i.e., a slowly varying pressure is transferred into the first compartment 10.

An advantage of this design is that the main part of the housing does not have to withstand the very high pressures experienced at large sea depths. However, the second compartment 20 allocating the hydrophone H requires a high strength construction if the air backing is desirable, in which case high pressure penetrators are also required to lead the optical fiber into and out of the second compartment 20.

For some embodiments, a steel wall having a thickness of 10.0 mm or more is desirable both for sealed versions and pressure balanced versions of the seismic sensor station in order to provide sufficient stiffness to protect the accelerometers from external pressure variations and bending effects on the housing when subjected to changes in pressure or external mechanical influence.

In some embodiments, a high pressure accumulator 87 (shown in FIGS. 2, 5 and 6) arranged inside the first compartment 10 of the housing provides a compressible volume to enable proper functioning of the AC pressure filter and for accumulating pressure fluctuations in the first compartment 10 of the housing caused for example by the compression of the walls of the housing. The AC pressure filter can also to some extent work without the use of a high pressure accumulator, exploiting the compressibility of the oil (a high compressibility is desirable), provided there is a sufficient oil volume and a sufficiently stiff housing and housing walls.

In some situations, oil backing of an internal hydrophone provides a sufficient response. In this case, the design of FIG. 5 can be simplified by removing the wall separating the first compartment 10 and the second compartment 20, effectively forming a single compartment accommodating all the sensors and fiber Bragg gratings of the seismic station, as illustrated in FIG. 6.

While the embodiments of the seismic sensor station housing according to the invention shown in FIGS. 1-3 and 5 require four fiber splices 55 inside the liquid filled compartment 10 of the housing 1, two for connecting to the input/output fibers and two for connecting to the optical fiber of the hydrophone H, the embodiments illustrated in FIGS. 4 and 6 can be realized with as little as two fiber splices 55, a first fiber splice for connecting to the input optical fiber 31 from the optical signal supply to the internal optical fiber 32 inside the housing 1 and a second fiber splice for connecting the internal optical fiber 32 inside the housing 1 to the output optical fiber 33 going to a next seismic station along an array of seismic stations.

Figure 7:
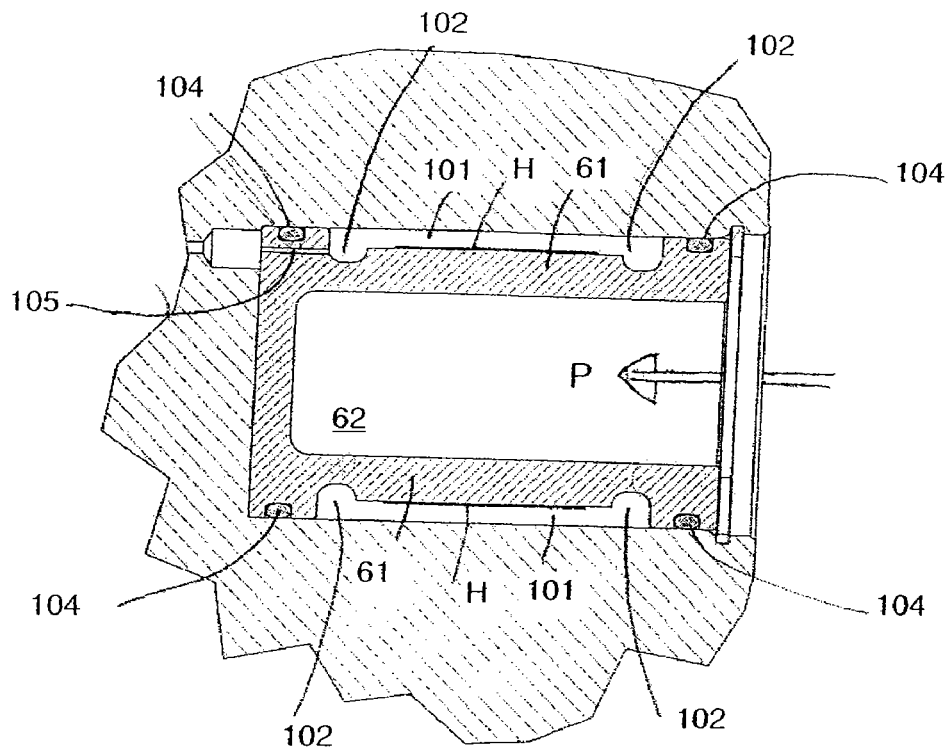
FIG. 7 is a cross sectional view of an internally pressurized hydrophone according to one embodiment of the invention where an optical fiber coil is wound onto an air backed cylindrical structure for use in a seismic sensor station.

FIG. 7 illustrates in more detail a cross sectional view of one example of the internally pressurized hydrophone H of FIGS. 3 and 5, where the hydrophone optical fiber coil is wound onto a structure 61 that can be an air backed cylindrical structure, i.e., a cylindrical structure defining an internal volume 62. An air backing volume 101 in this case is a gas or air filled volume sealed at a pressure of about 1.0 bar, while the internal volume 62 is open towards the external environment having a pressure P, as indicated by the arrow in FIG. 7. The optical fiber coil of the hydrophone is arranged on, preferably in a coiled fashion, a curved external surface portion of the structure 61 of an even thickness and between two annular grooves 102 in the wall of the structure 61. The grooves 102 reduce the thickness of the structure 61, causing a localized weakening of the structure. In this way, a substantially homogeneous radial compression or expansion of that part of the structure 61 which carries the hydrophone fiber results when the seismic station housing is subjected to a changing pressure. End-effects which in other hydrophone constructions can potentially cause a non-homogeneous compression or expansion of the cylindrical structure along the hydrophone coil are significantly reduced by providing such grooves. Pressure seals 104 are arranged in separate seal grooves thereby sealing the air backing volume 101 of the structure 61. In this case, the air backing volume 101 corresponds to the second compartment 20 of the housing 1. The optical fiber of the hydrophone coil passes to and from the first compartment 10 of the seismic sensor station housing via a fiber penetrator 105.

An advantage of this principle of internal pressurization is that the hydrophone sensor can be produced from a fairly thin-walled pipe or tube, with a thickness of the hydrophone wall of about 8.0 mm or less, preferably in the range of 2.0 to 8.0 mm if produced from a plastic, e.g., polycarbonate, and preferably in the range of less than 1.0 mm if made of a metal, for example titanium, in order to achieve high deformation/sensitivity to pressure changes, while still being able to withstand fairly large hydrostatic pressures at large depths. Contrary to externally pressurized hydrophones, the internally pressurized hydrophone sensor structure is not so susceptible to buckling which can damage the sensor construction. A construction pressurized from the inside is typically a much more stable construction even for thinner walls and even if the sensor is produced with an internal cavity of some size, for example with a typical inner diameter of 10.0 to 50.0 mm and a length of 30.0 to 50.0 mm.

Figure 8:
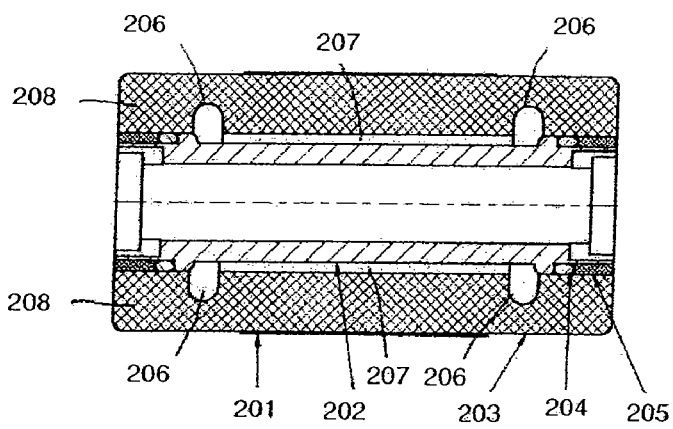
FIG. 8 is a cross sectional view of an externally pressurized hydrophone according to one embodiment of the invention where the optical fiber is wound onto a wall of the hydrophone for use in a seismic sensor station.

FIG. 8 illustrates in more detail a cross sectional view of an externally pressurized hydrophone, where a fiber coil 201 is wound onto an external wall 203 of a hydrophone cylinder 208 made of, for example, polycarbonate. Inside the cylinder 208 there is arranged a hydrophone core 202 made of, for example, stainless steel type AISI 304. Between the hydrophone cylinder 208 and the hydrophone core 202, there is defined a sealed air volume 207, which corresponds to the internal volume 62 in FIGS. 1 and 2. The air volume 207 is sealed by O-rings 204 made of, for example, nitrile, and bonds 205 made using, for example, an epoxy based glue. In a manner similar to the case for the internally pressurized hydrophone illustrated in FIG. 7, there are provided annular grooves 206 in the wall of cylindrical structure 208 where the wall thickness is slightly reduced, thereby enabling a larger deflection of the wall of the cylinder and reducing end-effects when external pressure acts on the hydrophone structure.

Figure 9:
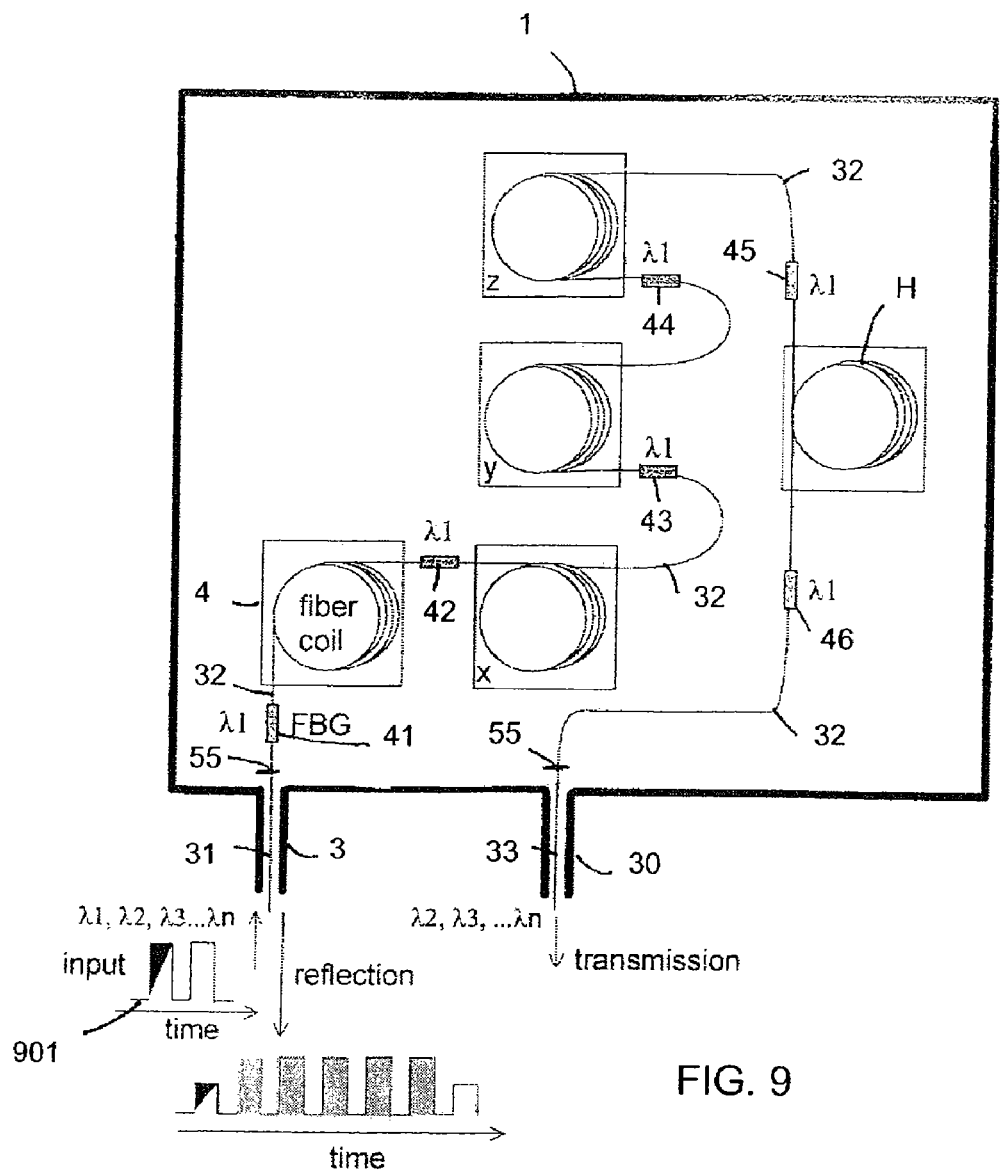
FIG. 9 illustrates optical interrogation of an assembly of three accelerometers and a hydrophone on a single optical fiber running through a seismic station, wherein the interrogation includes an optical double pulse signal guided into the station and a typical reflected train of pulses from the assembly of sensors, typically realized in the form of fiber Bragg gratings.

FIG. 9 illustrates one possible interrogation technique for the accelerometers x, y, z and the hydrophone H of a seismic sensor station with the housing 1 according to embodiments of the invention. An optical double pulse signal 901 of a wavelength corresponding to the Bragg wavelength $\lambda_1$ of the fiber Bragg gratings 41-46 is launched into the internal optical fiber 32 inside the housing. The time difference between the two pulses of the optical double pulse is initially suited to the optical propagation delay between each pair of consecutive Bragg gratings. Thus, in the optical signal reflected from the Bragg gratings, a reflection of the second pulse from the first fiber Bragg grating superposes on the reflection of the first pulse from the second fiber Bragg grating. The length of fiber between each fiber Bragg grating is initially set to an equal optical path, in order that signals reflected from two consecutive Bragg gratings superposes. Thus, any change in the optical path lengths between the fiber Bragg gratings, as typically results from external influences on the accelerometer or hydrophone fiber coils alters the resulting superposed reflected signal from one seismic station. Several seismic stations may be wavelength multiplexed by choosing different Bragg wavelengths for the fiber Bragg gratings of each seismic sensor station. FIG. 9 illustrates that the Bragg gratings of the shown seismic sensor station are set at a first optical wavelength $\lambda_1$, while the optical signal may comprise light at other wavelengths $\lambda_2, \lambda_3, \lambda_4, \lambda_n$, intended for other seismic sensor stations and passing virtually un-reflected through the shown seismic housing 1. A readout technique described in United States patent publication number 2005/0046859, hereby incorporated by reference in full, gives a more detailed description of a possible readout technique for the fiber Bragg gratings used in this invention.

To conclude, the above described embodiments of a seismic sensor housing 1 according to embodiments of the invention provide solutions without a separate splicing chamber for the optical fibers at each seismic station. Further, crosstalk is reduced in the seismic station using the described housing arrangement. A minimum number of high pressure penetrators are used, and, in some embodiments, such high pressure penetrators can be altogether avoided. As all the sensors can be produced in a single length of fiber, the number of fiber splices per station can be reduced to two at the optical fiber input/output of the housing 1. With a separate compartment for the hydrophone, two additional internal splices may be required.

While the foregoing is directed to embodiments of the present invention, other and further embodiments of the invention may be devised without departing from the basic scope thereof, and the scope thereof is determined by the claims that follow.

What is claimed is:

1. A seismic sensor station, comprising:
   a housing;
   a fiber optic hydrophone disposed in the housing;
   a fiber optic accelerometer arranged inside the housing, wherein the fiber optic accelerometer is arranged in a liquid filled compartment of the housing for dampening of mechanical resonances in the accelerometer due to mechanical disturbances and pressure fluctuations, wherein the accelerometer is made from a single length of optical fiber, and the hydrophone and the accelerometer are arranged along the single length of optical fiber; and
   an array of fiber Bragg gratings forming an array of interferometers, whereby one interferometer is provided for each of the hydrophone, the accelerometer and a reference, wherein all of the fiber Bragg gratings are located in the liquid filled compartment of the housing.

2. The seismic sensor station according to claim 1, wherein the liquid filled compartment containing the accelerometer is pressure isolated.

3. The seismic sensor station according to claim 2, further comprising an air bladder arranged within the liquid filled compartment.

4. The seismic sensor station according to claim 1, further comprising a pressure transfer device for transferring pressure variations between a surrounding environment and an inside of a hydrophone compartment of the housing, wherein the hydrophone compartment contains an optical fiber coil of the hydrophone.

5. The seismic sensor station according to claim 4, wherein the pressure transfer device comprises a flexible membrane.

6. The seismic sensor station according to claim 4, wherein the pressure transfer device comprises a liquid filled bladder.

7. The seismic sensor station according to claim 5, wherein the pressure transfer device comprises an elongated tubular structure providing an opening between the liquid filled compartment and the hydrophone compartment for passing DC and low frequency pressure fluctuations into the liquid filled compartment while at the same time blocking high frequency pressure signals form entering the liquid filled compartment.

8. The seismic sensor station according to claim 1, wherein the liquid filled compartment containing the accelerometer is pressure balanced towards a surrounding environment.

9. The seismic sensor station according to claim 8, further comprising a pressure transfer device for transferring pressure variations between the surrounding environment and an inside of the liquid filled compartment.

10. The seismic sensor station according to claim 9, wherein the pressure transfer device comprises a flexible membrane.

11. The seismic sensor station according to claim 9, wherein the pressure transfer device comprises a liquid filled bladder.

12. The seismic sensor station according to claim 9, wherein the pressure transfer device comprises an elongated tubular structure for providing an opening between an inside volume of the housing and the external environment which passes DC and low frequency pressure fluctuations but blocks high frequency pressure signals from entering the housing.

13. The seismic sensor station according to claim 12, wherein a diameter of the tubular structure is smaller than a length of the tubular structure.

14. The seismic sensor station according to claim 1, wherein the accelerometer and the hydrophone are both arranged within the liquid filled compartment of the housing.

15. The seismic sensor station according to claim 1, wherein the hydrophone is arranged in a hydrophone compartment of the housing separate from the liquid filled compartment.

16. The seismic sensor station according to claim 1, wherein an internal bladder is placed in contact with an internally pressurized hydrophone to provide a combined function of internal pressure compensation and air-backing of the hydrophone.

17. The seismic sensor station according to claim 1, wherein a high pressure accumulator is arranged inside the housing.

18. The seismic sensor station according to claim 1, wherein the hydrophone comprises a cylindrical structure provided with two separated annular grooves on an external curved surface of the cylindrical structure, and wherein a hydrophone coil is arranged on a part of the external curved surface of the cylindrical structure between the grooves, whereby the grooves cause a localized weakening of the cylindrical structure yielding a substantially homogeneous radial compression or expansion of the part of the cylindrical structure which carries the hydrophone coil when the seismic sensor station is subjected to changes of pressure in a surrounding environment.

19. The seismic sensor station according to claim 1, wherein the hydrophone comprises a tube having a wall thickness of 8.0 millimeters or less.

20. The seismic sensor station according to claim 1, wherein the hydrophone and the accelerometer are produced from the single length of optical fiber.

21. The seismic sensor station according to claim 1, wherein the single length of optical fiber inside the housing also provides a reference interferometer.

22. The seismic sensor station according to claim 1, wherein the Bragg gratings of the station are set at a first optical wavelength, thereby enabling wavelength multiplexing of several seismic stations by choosing different Bragg wavelengths for the Bragg gratings of each seismic station.

* * * * *